United States Patent [19]
Wilson

[11] Patent Number: 4,558,503
[45] Date of Patent: Dec. 17, 1985

[54] METHOD OF ASSEMBLING A REFRIGERATOR

[75] Inventor: Arthur C. Wilson, Louisville, Ky.

[73] Assignee: General Electric Company, Louisville, Ky.

[21] Appl. No.: 622,257

[22] Filed: Jun. 19, 1984

[51] Int. Cl.$^4$ .............................................. B23P 11/02
[52] U.S. Cl. ........................................ 29/446; 29/464; 29/526 R; 312/214
[58] Field of Search ................. 29/446, 452, 449, 464, 29/526 R; 312/214, 116; 62/275; 248/221.3

[56] References Cited

U.S. PATENT DOCUMENTS

| | | | |
|---|---|---|---|
| 1,840,169 | 1/1932 | Nash | 29/464 UX |
| 2,293,399 | 8/1942 | Moecker, Jr. et al. | 29/464 UX |
| 2,845,321 | 7/1958 | Sauders et al. | 312/214 |
| 3,157,306 | 11/1964 | Courson | 220/9 |
| 3,290,109 | 12/1966 | Vanegas | 312/326 |
| 3,365,079 | 1/1968 | Mauguen et al. | 29/449 X |
| 3,499,258 | 3/1970 | Durand | 29/464 X |
| 3,652,032 | 3/1972 | Eros et al. | 248/221.3 X |
| 3,674,359 | 7/1972 | Crowe | 312/214 |
| 3,817,146 | 6/1974 | Scott | 29/464 X |
| 3,832,432 | 8/1974 | Perry | 29/464 X |
| 3,849,012 | 11/1974 | Krause | 29/464 X |
| 3,868,152 | 2/1975 | Dixon | 312/214 |
| 3,886,648 | 6/1975 | Kahn | 29/452 |
| 3,908,260 | 9/1975 | Loomis et al. | 29/464 X |
| 4,050,753 | 9/1977 | Scherrer | 312/214 X |
| 4,067,628 | 1/1978 | Sherburn | 312/214 |
| 4,120,550 | 10/1978 | Sherburn | 312/296 |
| 4,150,518 | 4/1979 | Truesdell et al. | 52/804 |
| 4,170,391 | 10/1979 | Bottger | 312/214 |
| 4,330,310 | 5/1982 | Tate, Jr. et al. | 62/275 |

FOREIGN PATENT DOCUMENTS 999631 11/1976 Canada .................................. 312/214

*Primary Examiner*—Charlie T. Moon
*Attorney, Agent, or Firm*—Frederick P. Weidner; Radford M. Reams

[57] ABSTRACT

A method of assembling a refrigerator cabinet having an outer metal shell with side walls, a plastic inner liner and an insulation partition separating a freezer and fresh food compartment. Mounting brackets each having a preset fastener location are mounted on each side of the outer shell adjacent the partition. The insulation partition is faced with a plastic mullion component having a cutout section at both ends. A flexible metal tension cross member is formed having a preset fastener opening at each end thereof spaced apart a distance such that when the flexible metal tension cross member is utilized to draw the cabinet side walls together and fastened at both ends at the preset fastener openings to the preset fastener locations on the partition mounting brackets the outer shell of the refrigerator cabinet will have the desired correct cabinet width.

5 Claims, 5 Drawing Figures

METHOD OF ASSEMBLING A REFRIGERATOR

BACKGROUND OF THE INVENTION

In the construction of a household refrigerator, it is often desirable to provide a partition within the refrigerator for separating the refrigerator into first and second compartments such as a freezer compartment and a fresh food compartment, for example. It is further desirable to have the partition constructed in such a manner that there is a mullion across the front of the partition and secured to the cabinet outer case to afford a pleasing appearance. The freezer and fresh food compartments are in many cases closed by separate access doors which are hingedly attached to the cabinet outer case. For the pleasing appearance of the mullion and the proper fit of the doors for the freezer and fresh food compartments it is important that the width of the refrigerator cabinet be maintained to a given tolerance from the top of the cabinet to the bottom and particularly in the area where the mullion spans the two sides of the refrigerator.

It has been recognized that certain foam resins permanently containing in their cells vapors having a low co-efficient of heat transmission provides superior insulating qualities to refrigerator cabinets. The refrigerator normally employs a sheet metal outer casing and either a sheet metal or plastic inner liner with an insulation medium interposed therebetween. Polyurethane compositions in liquid/gas form are introduced into the space between the outer casing and inner liner, expand throughout the space and then are solidified by curing. Normally there are molds and fixtures to keep the refrigerator cabinet in its desired shape during the foaming operation, however, there is still a problem with the side walls of the outer casing of the cabinet bulging or bowing outwardly during the foaming operation as the result of the pressures generated within the space being insulated. As a result refrigerator cabinets have a tendency to bow outwardly and during the assembly of the cabinet and installation of the mullion partition between the freezer and fresh food compartments and the hanging of the doors on those compartments is made difficult. It is desirable to be able to easily size the refrigerator cabinets so that the bowing is overcome and essentially the width between the side walls of the refrigerator cabinet is the same from the top of the cabinet to the bottom of the cabinet.

By my invention there is provided a method of assembling a refrigerator cabinet wherein a cabinet that may be slightly bowed can be adjusted to eliminate the bowing and thereby provide a pleasing appearance for the mullion and the proper alignment of the doors to the cabinet.

SUMMARY OF THE INVENTION

There is provided a method of assembling a refrigerator cabinet of the type having an outer metal shell with side walls and a front face, a plastic inner liner and an insulation partition assembly separating the freezer and fresh food compartments. The insulation partition assembly is placed across the refrigerator between the freezer and fresh food compartments. Mounting brackets for securing the insulation partition assembly are mounted on each side of the outer shell adjacent the partition insulation and these brackets each have a portion extending inwardly perpendicular to the side walls of the outer case and have a preset fastener location. The insulation partition assembly includes plastic mullion component having a cutout section at both ends thereof. There is provided by forming a flexible metal tension cross member having a preset fastener opening at each end thereof spaced apart a distance such that when the flexible metal tension cross member is fastened at both ends at the preset fastener openings to the preset fastener locations on the partition mounting brackets the outer shell of the refrigerator cabinet will have the desired correct cabinet width. To accomplish this, one end of the flexible tension cross member is inserted through one of the mullion cutout sections and secured through the preset fastener opening to the preset location on one of the partition mounting brackets. The other end of the flexible tension cross member is inserted through the other mullion cutout section and the preset fastener opening of the flexible tension cross member is drawn into alignment with the preset fastener location on the other mounting member. The flexible tension cross member is secured through the preset fastener opening to the mounting member at the preset fastener location. This method of assembly sizes the cabinet to the correct width in the particularly critical area of the insulation partition.

DESCRIPTION OF THE PREFERRED EMBODIMENT

Figure 1:
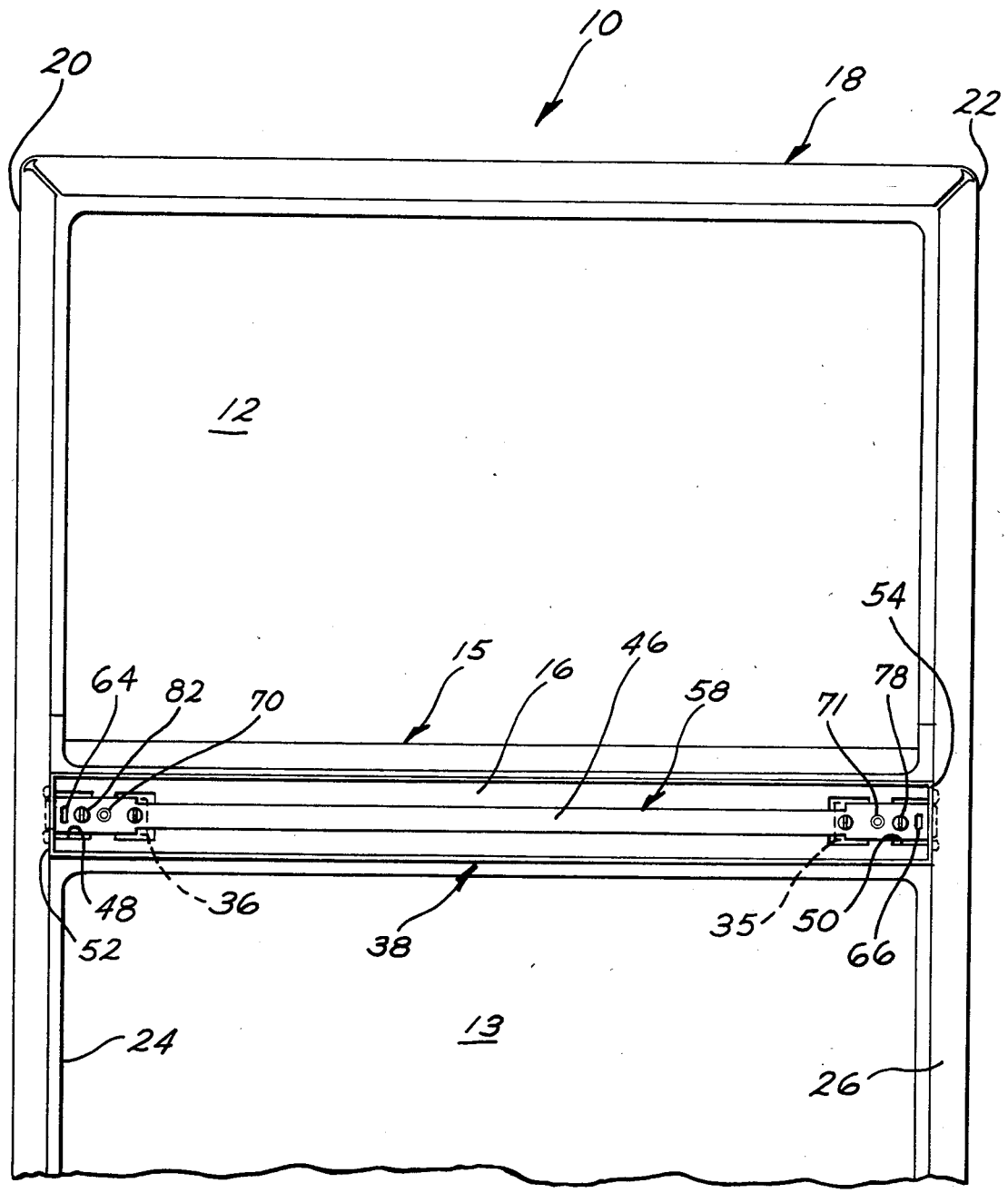
FIG. 1 is a front elevational view of a portion of a top mount refrigerator showing both the fresh food compartment below and the freezer compartment above and including the insulation partition assembly between those compartments and some of the components for assembling the refrigerator in accordance with the present invention.
Figure 2:
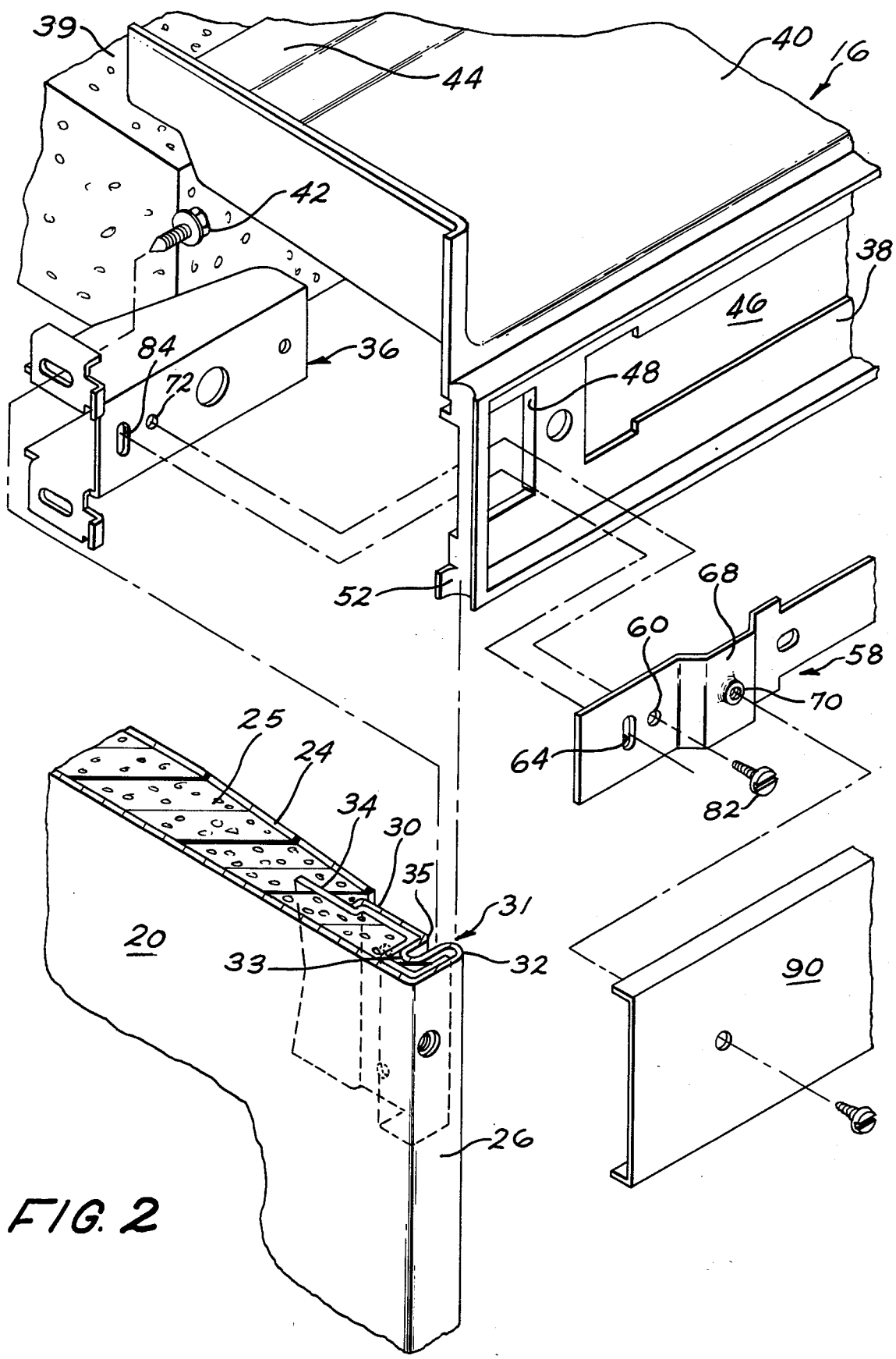
FIG. 2 is an exploded perspective view showing the components of the refrigerator used in connection with assembling the refrigerator in accordance with the present invention.

Referring to FIGS. 1 and 2, a refrigerator 10 such as a top mount household refrigerator, for example, has a freezing compartment 12, and a fresh food compartment 13 separated by an insulation partition assembly 15 having a forwardly positioned mullion component 16. Upon completion of the assembly of the refrigerator the freezer compartment and fresh food compartment would have separate doors (not shown) for closing the respective compartments. The refrigerator 10 has a cabinet outer metal case or shell 18 that has opposite side walls 20 and 22 which envelops both the freezer and fresh food compartments. The outer metal shell 18 has an interior liner 24 which is made of sheet metal or plastic material. Between the inner liner 24 and outer metal shell 18 there is insulation 25. This insulation in many refrigerators consists of polyurethane foam which is in liquid form and inserted or injected into the space between the outer metal shell 18 and the interior liner 24 and then cured in place so that it solidifies and forms cells which exhibit good thermal insulation characteristics. During the polyurethane foaming operation gases are generated which exerts internal pressure and in many cases causes the outer metal shell 18 to bulge or bow outwardly and thus cause some distortion of the side walls 20 and 22 of the outer metal shell 18. It is desirable, however, that the bowing or bulging of the outer shell be corrected and eliminated prior to the final assembly of the refrigerator so that the insulation partition 15 and the mullion 16 fit correctly along the liner 24 with no gaps between those components. Moreover, when the doors for the freezer compartment and fresh food compartment are hung it is again important that the case dimension from one side 20 to the other side 22 be the same throughout the height of the refrigerator so that the doors align and seal correctly.

Figure 3:
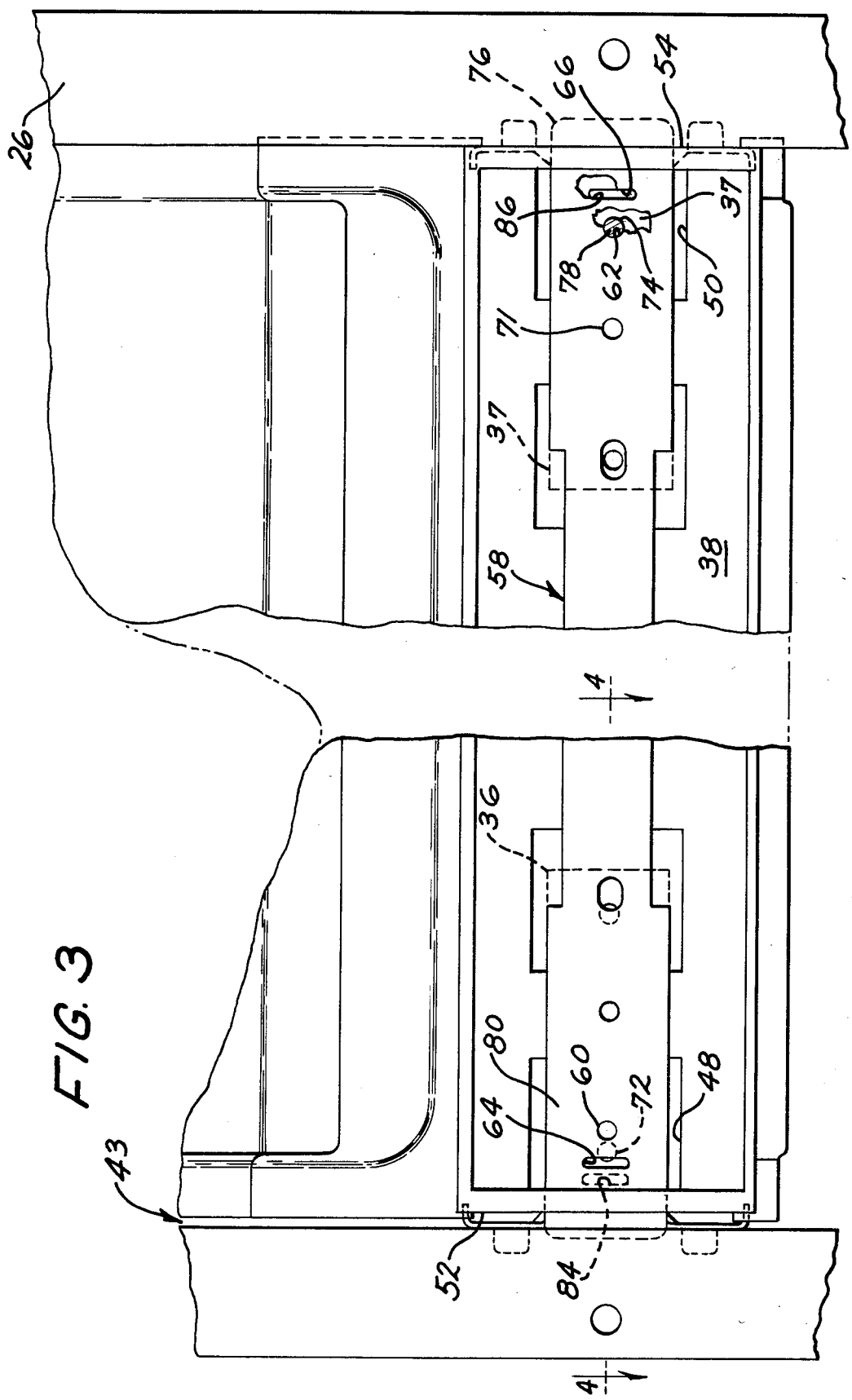
FIG. 3 is a fragmented view showing some of the components used in assembling the refrigerator according to the present invention.

With particular reference to FIGS. 2 and 3 the components and their arrangement involved with the method of assembling a refrigerator cabinet will be discussed. While only one side of the refrigerator is shown it is to be understood that the other side of the refrigerator will have the same components and arrangement. Prior to the foaming operation to provide the insulation 25 between the outer metal shell 18 and interior liner 24 the outer shell is formed to provide a front face 26 against which the doors of the freezer and fresh food compartments would engage and seal and which the hinges for the doors may be mounted. There is a flange 30 depending inwardly from the front face 26 which usually has an "S" shaped formed portion 31 which has a first reverse bend 32, a second reverse bend 33, and a right angle bend 35. The edge of the interior liner 24 is inserted into the space between these bends prior to the foaming operation. The flange 30 is spaced from the side wall 20 to allow the foam to have access to that area of the outer case. A backup plate 34 which is a strong rigid metal nutstrip is located between the flange 30 and side wall 20 by suitable fastener means prior to the insulation foaming operation. After the foaming operation the solidified insulation material surrounding the backup plate 34 and bonding it to the outer case greatly enhances the structural integrity between the backup plate 34 and the relatively thin sheet metal outer case. Thus the backup plate 34 adds considerable strength to the area where the partition mounting bracket 36 will be mounted to the respective side walls 20 and 22 and also it may be used to mount the door hinges.

The insulation partition assembly 15 includes a block of insulating material 39 such as styrofoam which is inserted between the fresh food compartment and freezer compartment. The insulation block 39 is faced with a mullion component 16 which is usually molded from plastic material. There is a space between the mullion front face 38 and the insulation block with the transition space covered by the upper mullion surface 40. The space between the mullion front face 38 and the insulation block 39 is utilized for electrical wiring for various components of the refrigerator.

After the insulation block 39 is located in its proper position the partition mounting brackets 36 and 37 are secured to the outer metal shell 18 by suitable fasteners 42 which are received in the backup plate 34 to thereby rigidly retain the mounting brackets on the outer shell against the flange 30. After the partition mounting brackets 36 and 37 are mounted on each side wall 20 and 22 the mullion component 16 is inserted between the side walls. The mullion component 16 is to fit snugly between the side walls 20 and 22 so that there are no unsightly gap 43 (FIGS. 3 and 4) between the mullion component and the side walls. Any gap is usually caused by the bowing of the side wall during the foam insulation operation and if the side wall is bowed outwardly, the cabinet needs to be sized correctly in the insulation partition area. The mullion front face 38 has a recessed area 46 extending a substantial length along the middle of the mullion front face 38 and at each end of the mullion front face 38 there is provided a cutout section 48 and 50, respectively. It will be noted that the edges 52 and 54 of the mullion front face 38 each have a shape complimentary to the reverse bend 32 between the front face 26 and flange 30 of the outer metal shell side walls 20 and 22.

There is formed a flexible metal tension cross member 58 having preset fastener openings 60 and 62 one at each end thereof. Adjacent the fastener openings 60 and 62 are vertical slot openings 64 and 66, respectively. Inwardly of the preset fastener opening 60 is a raised portion 68 that departs the plane of the rest of the flexible tension cross member 58 and which has an embossed fastener opening 70.

The partition mounting brackets 36 and 37 each have a preset fastener location 72 and 74 respectively which in the case of the preferred embodiment is an aperture through the vertical portion of the bracket extending inwardly perpendicular to the outer case or side walls 20 and 22. The distance between the preset fastener openings 60 and 62 of the flexible metal tension cross member 58 in cooperation with the preset fastener locations 72 and 74 respectively on the mounting brackets 36 and 37 respectively determine the desired width of the outer casing of the refrigerator. That is, when the flexible metal tension cross member 58 is secured, as will be described later, at both ends to the brackets 36 and 37 at the preset fastener locations 72 and 74 respectively the refrigerator width will be the correct desired dimension.

Figure 4:
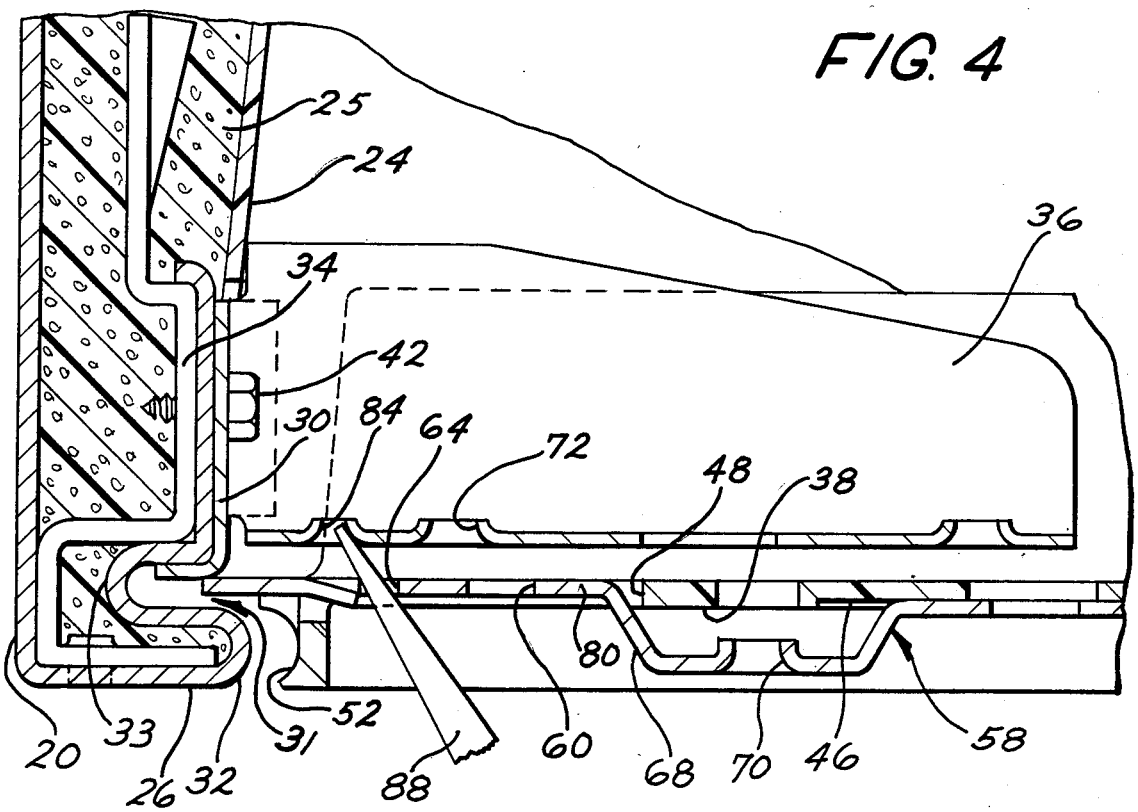
FIG. 4 is a view taken along lines 4—4 of FIG. 3 showing some of the components and their arrangement during the assembly of the refrigerator cabinet according to the present invention.
Figure 5:
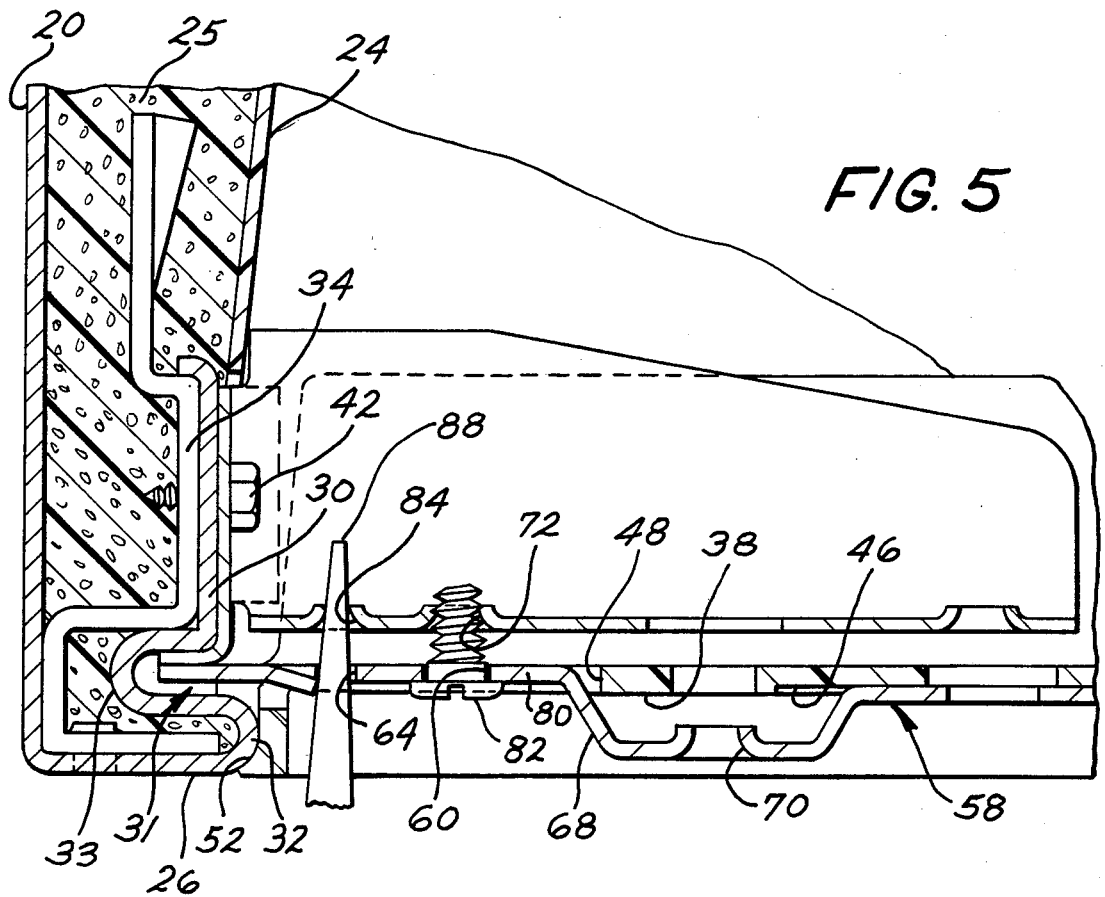
FIG. 5 is similar to FIG. 4 and shows the completion of the assembly of the refrigerator cabinet according to the present invention.

The next step in the method of assembling the refrigerator cabinet is to insert one end 76 of the flexible metal tension cross member 58 as shown in FIG. 3 through the cutout section 50 of the mullion front face 38 and by fastener means such as by passing a threaded screw 78 through the preset fastener opening 62 and into the preset fastener location 74 on the bracket 37 it is secured to mounting bracket 37. The opposite end designated 80 of the flexible metal tension cross member 58 has the preset fastener opening 60 not in alignment with the preset fastener location 72 of the mounting bracket 36 as can be seen in FIG. 3 and also in FIG. 4. This misalignment may be due to the bowing of the side walls of the cabinet and needs to be corrected or sized in order to bring the preset fastener opening 60 and preset fastener location 72 into alignment before the screw fastener 82 can be passed through the preset fastener opening 60 and preset fastener location 72. For this purpose there is provided a vertical slot opening 64 in the flexible metal tension cross member 58 and also a vertical slot opening 84 in the mounting bracket 36 each adjacent and an equal distance from the preset fastener opening 60 and preset fastener location 72, respectively. A tool such as a bladed screw driver 88 is inserted through the vertical slot opening 64 in the flexible metal tension cross member 58 and into the vertical slot opening 84 of the bracket 36. The tool is utilized as a lever which has its fulcrum point against the side wall of slot 84 in bracket 36. The tool 88 is then moved clockwise as shown in FIG. 4 to the position shown in FIG. 5 wherein the slots 64 and 84 are now in alignment and therefore also the preset fastener opening 60 and the preset fastener location 72 so that now threaded fastener 82 may pass through those openings and secure them in the proper position. When this has been achieved the side walls of the refrigerator have been moved toward each other thereby eliminating the bulge or bowing in the side wall and the cabinet width is sized in the insulation partition assembly area. It will be noted that slot 66 is also provided adjacent the preset fastener opening 62 in end 76 of the flexible metal tension cross member 58 and also slot 86 is provided in mounting bracket 37 so that either end of the metal tension cross member 58 may be utilized to size the cabinet as described above. It will be further noted that the recessed area 46 of the mullion front face 38 is dimensioned to receive the flexible metal tension cross member 58 when it is secured to the mounting brackets 36 and 37.

After the sizing operation has been complete and the flexible metal tension cross member 58 secured to both brackets 36 and 37 a mullion face plate 90 is used to cover the assembly and by fastener 92 it is secured to the raised section 68 through embossed fastener opening 70 in the flexible metal tension cross member 58. The other end of the mullion face plate 90 (not shown) is attached in a similar manner.

With the above-described method of assembling a refrigerator cabinet, the side walls have been sized for the correct width so that the insulation partition assembly and particularly the mullion front face 38 fits snugly against the side walls 20 and 22 and the mullion face plate 90 gives a pleasing appearance with no gaps between the component parts. If it is desired, additional fasteners may also be utilized to secure the flexible tension cross member 58 to the brackets 36 and 37 for added structural integrity.

While the specific embodiment and method of this invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method of assembling a refrigerator cabinet of the type having an outer metal shell with side walls and a front face, an inner liner and a partition separating the freezer and fresh food compartments comprising:

placing an insulated partition assembly across the refrigerator between the freezer and fresh food compartments;

securing a partition mounting bracket on each side of the outer shell adjacent the partition, said brackets each having a portion extending inwardly perpendicular to the side walls of the outer shell with a preset fastener location;

facing the insulation partition with a mullion component having a cutout section at both ends thereof;

forming a flexible metal tension cross member having a preset fastener opening at each end thereof spaced apart a distance such that when the flexible metal tension cross member is fastened at both ends to the preset fastener locations on the partition mounting brackets the outer shell will have the correct cabinet width;

inserting one end of the flexible tension cross member through one of said mullion cutout sections and securing it through the preset fastener opening to the preset location on one of the partition mounting brackets;

inserting the other end of the flexible tension cross member through the other mullion cutout section;

drawing the flexible tension cross member into alignment between the preset fastener opening and the preset fastener location on the other mounting member; and securing the flexible tension cross member through the preset fastener opening to the mounting member at the preset fastener location.

2. The method of assembling a refrigerator cabinet according to claim 1 wherein one of the partition mounting brackets has an adjustment opening adjacent the preset fastener location and the flexible tension cross member has an adjustment opening adjacent the preset fastener opening and drawing the flexible tension cross member into alignment between the preset fastener opening and the preset fastener location on the other mounting member is by inserting a tool through said adjustment openings and using it as a lever with the fulcrum being the periphery of the adjustment opening in the mounting bracket.

3. The method of assembling a refrigerator cabinet according to claim 2 wherein the adjustment opening adjacent the bracket preset fastener location and the adjustment opening adjacent the preset fastener opening in the flexible tension cross member are both vertical slots and the tool is bladed.

4. The method of assembling a refrigerator cabinet according to claim 2 wherein both partition mounting brackets have an adjustment opening adjacent the preset fastener location and both flexible tension cross member preset fastener openings have an adjacent adjustment opening.

5. The method of assembling a refrigerator cabinet according to claim 1 wherein the outer shell has a flange depending inwardly from the front face and spaced from the respective side walls and the partition mounting bracket on each side of the outer shell is secured to the outer metal case through said flange and fastened to a back-up plate located between the flange and side wall.

* * * * *